United States Patent [19]
Maier

[11] Patent Number: 5,603,531
[45] Date of Patent: Feb. 18, 1997

[54] BLIND ASSEMBLY-SWIVEL CROSSOVER TUBE

[75] Inventor: Mark S. Maier, West Palm Beach, Fla.

[73] Assignee: United Technologies Corporation, Hartford, Conn.

[21] Appl. No.: 349,847

[22] Filed: Dec. 6, 1994

[51] Int. Cl.$^6$ .................................................. F61L 27/04
[52] U.S. Cl. ........................ 285/165; 285/166; 285/300; 285/301
[58] Field of Search .................................... 285/165, 166, 285/298, 299, 300, 301; 239/265.19, 265.11; 60/228

[56] References Cited

U.S. PATENT DOCUMENTS

| | | | |
|---|---|---|---|
| 289,265 | 11/1883 | Hurly | 285/165 |
| 1,780,693 | 11/1930 | Yazel | 285/165 |
| 2,616,728 | 11/1952 | Pitt | 285/165 |
| 2,955,850 | 10/1960 | Bellinger | 285/165 |
| 3,173,710 | 3/1965 | Kinnison | 285/165 |
| 3,427,051 | 2/1969 | White et al. | 285/165 |
| 3,669,470 | 6/1972 | Deurloo | 285/165 |
| 4,690,329 | 9/1987 | Madden | 239/265.19 |

FOREIGN PATENT DOCUMENTS

337119  5/1921  Germany ................. 285/165

*Primary Examiner*—Eric K. Nicholson
*Attorney, Agent, or Firm*—Norman Friedland

[57] ABSTRACT

The crossover tube conducts fluid from the exhaust nozzle of a gas turbine engine to a blind receiver mounted in the sidewall of the airframe when assembled and deployed and includes a rigidly affixed forward ball and joint and a ball attached to the ends of each of a pair of tubes mounted in telescopic relationship with a clip secured to the coverplate covering the ball at the forward end cooperating with a pair of end to end mounted coil springs surrounding the tubes to hold the crossover tube in an erect and extended position to be guided into the receiver of the sidewall when deployed. In another embodiment bellows are utilized in place of the coil springs to provent leakage of fluid flowing in the crossover tube.

15 Claims, 7 Drawing Sheets

BLIND ASSEMBLY-SWIVEL CROSSOVER TUBE

This invention was made under a U. S. Government contract and the Government has rights herein.

CROSS REFERENCES

The following patent applications filed on even date relate to this patent application and all are commonly assigned to United Technologies Corporation:

F-7256 (attorney's docket no.) entitled "Exhaust Nozzle Cooling Scheme for Gas Turbine Engine" invented by Daniel E. Eigenbrode and Erik A. Lindstrom, Ser. No. 08/349,846 filed Dec. 6, 1994.

F-6720 (attorney's docket no.) entitled "Nacelle Air Pump for Vector Nozzles for Aircraft" invented by Mark Stefan Maier, Eric Joseph Gamble, Jack Wilcox Wilson, Eliott Luis Calzadilla and Gerald Frederick Goetz, Ser. No. 08/349,844 filed on Dec. 6, 1994.

F-7387 (attorney's docket no.) entitled "Aircraft Nacelle Ventilation and Exhaust Nozzle Cooling" invented by Douglas A. Thonebe and Russell L. Coons, Ser. No. 08/349,843 filed on Dec. 6, 1994.

TECHNICAL FIELD

This invention relates to a crossover tube for passing fluid from one location to another location and particularly to a crossover tube that is detachable, capable of 360 degree swiveling and that fits into a blind fitting and serves to pass fan air, that is in proximity to a vectoring exhaust nozzle of a gas turbine engine housed in the nacelle of aircraft, to the aircraft's side wall adjacent to the vectoring exhaust nozzle.

BACKGROUND ART

To understand the problem confronting the inventor at the time the invention was made consideration should be made to the prior art crossover tube heretofore designed for the exhaust nozzle cooling and venting system of the aircraft's nacelle and engine's exhaust nozzle. One end of the crossover tube attaches to the pumping housing which is a rigid body that is attached to the side wall located in an upstream location and the other end of the crossover tube attaches to a downstream end of the side wall closest to the engine's exhaust of the aircraft which is a relatively flexible body. The structure of the aircraft at this location evidences extreme loads which, in turn, causes severe deformation of the sidewalls. The crossover tube must be capable of withstanding these severe distortions and essentially must be capable of substantially 360 degrees of movement in all directions. In any given plane these distortions are relatively large aircraft-to-nozzle relative movements. Obviously, the end of the cross over tube must be capable of movement in the same direction that the aircraft structure flexes so as to avoid premature fatiguing and/or breakage of components.

Figure 1:
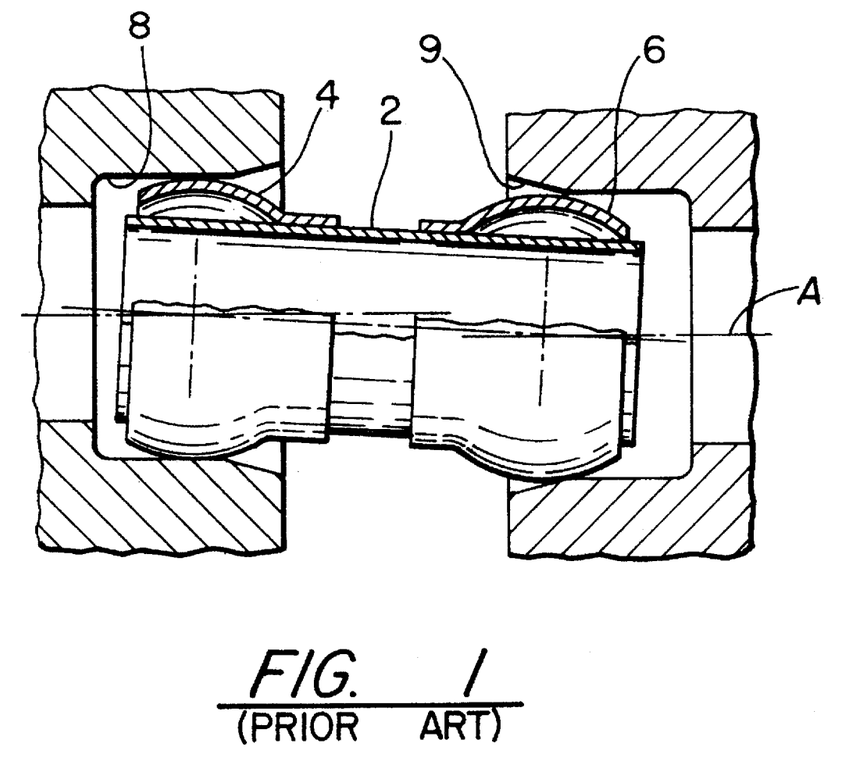
FIG. 1 is a sectional view of a prior art crossover tube.

The problems associated with the prior art crossover tubes can best be seen by referring to FIG. 1, which is a drawing partly in perspective and partly in section showing the prior art crossover tube 2 having opposed spherical ball fittings 4 and 6. These fittings are offset mounted so that their axis is offset relative to the central axis A of crossover tube 2. Each of the spherical ball fittings fit into complementary receivers 8 and 9 and when assembled allow the passage of fluid from one location to another. It is apparent from the foregoing that these prior art crossover tube have relatively limited movement together with other deficiencies that made it incapable of meeting the packaging and the movement requirements for the particular aircraft installation.

A more complex sealing arrangement for the spherical ball was considered for the crossover tube similar to the prior art configuration depicted in FIG. 1, but it required a larger tube length in order to meet the aircraft-to-nozzle relative movement. Not only did it result in a heavier assembly, it still evidenced the problems associated with the less sophisticated sealing arrangement depicted in FIG. 1. One of the major problems associated with these prior art crossover tubes was that it was virtually impossible to assemble the unit which had to fit into a complementary receiving fitting that were already in existence in the system that was hidden from view. Since the receiving tube to which it was to be connected cannot be seen by the person assembling the crossover tube, it is readily apparent that mating the parts were to say the least difficult, if not impossible. Moreover, this problem is acerbated because eight such cross over tubes must uniformly align all at once with eight mating receivers for the assembly to be completed.

The requirement of the aircraft could not tolerate a crossover tube with a limited angular movement and that could not meet the aircraft-to-nozzle relative movement requirements. Nor could it tolerate the longer tube that resulted from a more complex sealing arrangement because of the weight and size problems, given the envelope size of the overall exhaust nozzle configuration and the attendant deficit in engine performance.

I have found that I can obviate the problems noted in the above paragraphs by providing a spring loaded crossover tube that is capable of being connected to a blind connector and that swivels such that it has larger relative nozzle-to-aircraft relative motion than heretofore known designs. In another embodiment bellows are utilized to assure that there is adequate sealing of the crossover tube.

SUMMARY OF THE INVENTION

An object of this invention is to provide an improved cross-over tube to pass fan air from the nozzle to the airframe side wall interfacing the aircraft and its gas turbine engine. This invention is characterized as allowing a larger relative motion of the engine nozzle to the airframe while maintaining easy assembly, without requiring special costly tools to assist in the assembly.

A feature of this invention is the provision of telescoping tubes that are in sliding relationship and spring loaded such that the fore mounted tube attached to the fixed tube assembly has a momentum created by the resilient means and clip assembly such that the aft axially sliding tube is held in an erect position by a combination clip and spring assembly. In one embodiment a pair of axially aligned coaxially mounted bellows are utilized and in another embodiment a pair of axially aligned co-axial coil springs are utilized.

A feature of this invention is that in a 2-dimensional vector nozzle configuration, a plurality of spaced cross-over tubes are uniformally erected on both hemispheres of the engine such that upon assembly each of the nozzles uniformally attaches to the mating receivers mounted in the opposite interfacing side walls of the aircraft.

The foregoing and other features of the present invention will become more apparent from the following description and accompanying drawings.

BEST MODE FOR CARRYING OUT THE INVENTION

While this invention is disclosed in its preferred embodiment as a crossover tube utilized in the aft end of the exhaust nozzle of aircraft as one skilled in this art will appreciate, the invention has applications in other environments and is particularly efficacious in a blind assembly and where the crossover tube must deflect in planes about a 360 degree axis.

Figure 2:
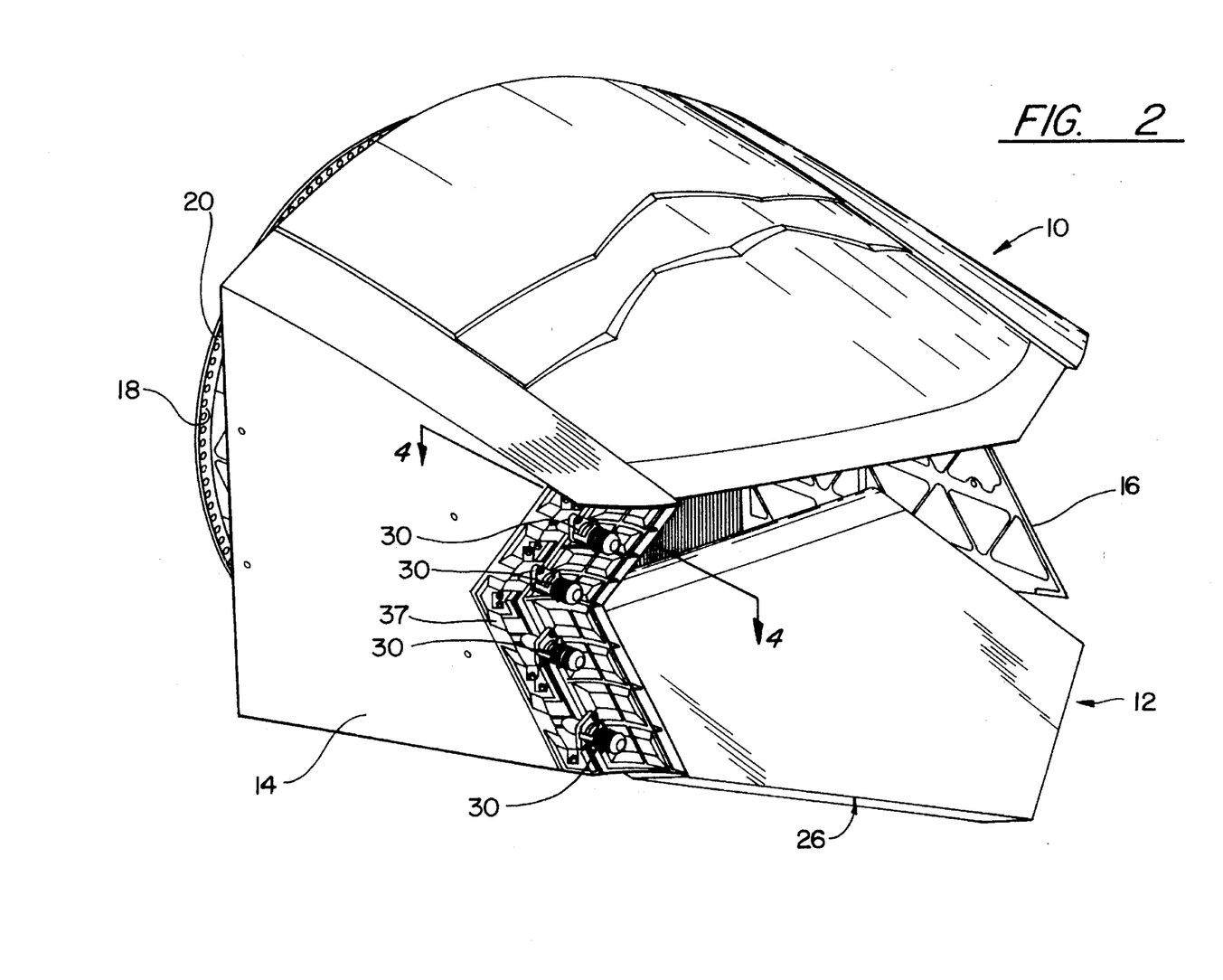
FIG. 2 is a perspective view of a two dimensional exhaust nozzle with a cutaway of the side wall illustrating plurality of crossover tubes of this invention attached to the pumping housing.
Figure 3:
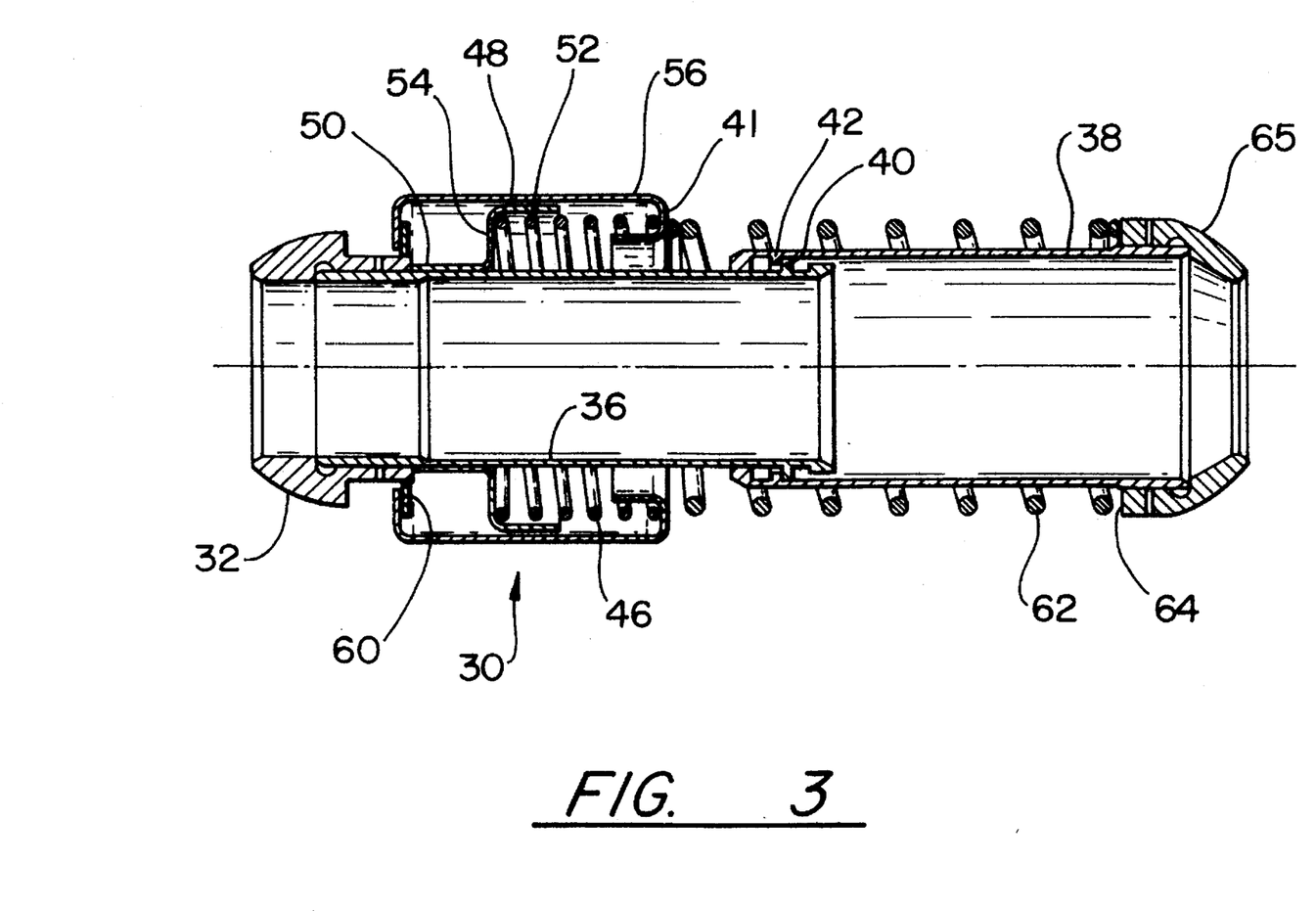
FIG. 3, is a sectional view taken along the longitudinal axis of the pumping system and showing a view in elevation of the crossover tube of this invention.
Figure 4:
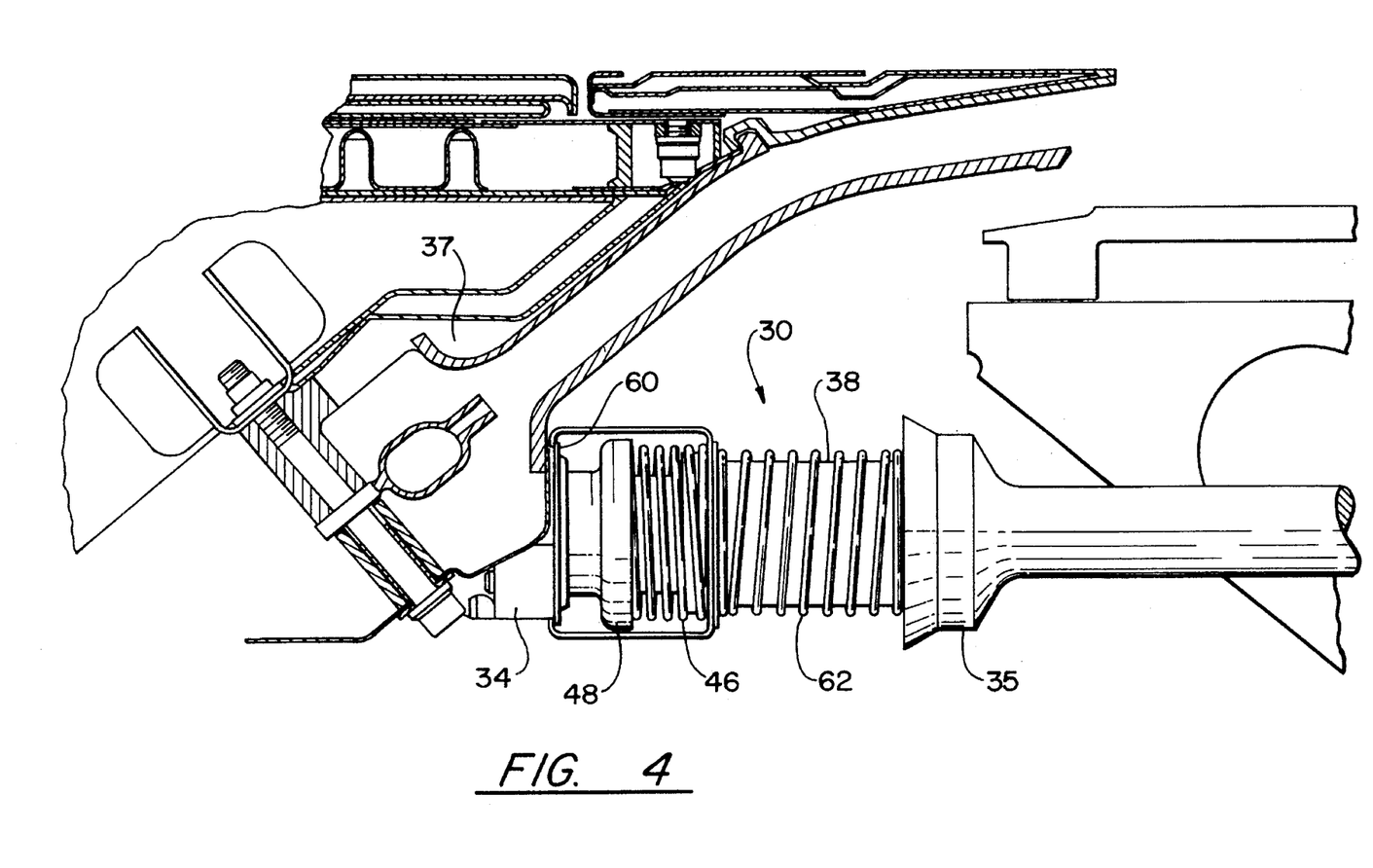
FIG. 4 is a sectional view taken along the longitudinal axis of the crossover tube illustrating the details of this invention.
Figure 5:
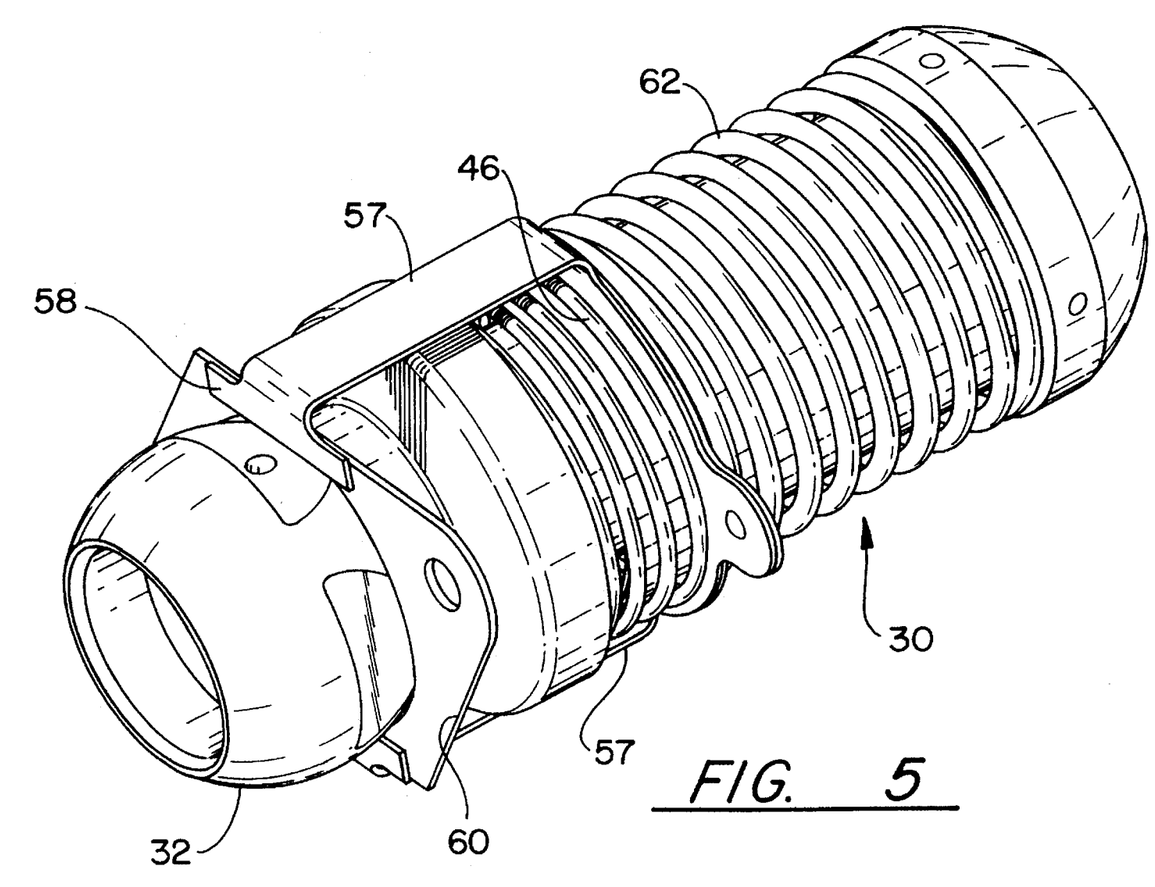
FIG. 5 is a perspective view of the present invention.

The invention can best be understood by referring first to FIG. 2 which shows the exhaust nozzle assembly 10 comprising external exhaust duct generally illustrated by the reference numeral 12. Exhaust duct 12 includes a pair of spaced apart sidewalls 14, 16 which fair into an upstream transition duct 18. the duct 18 has a substantially circular inlet 20. The nozzle assembly 10 further includes upper and lower flap assemblies 26, each comprising a suitable and well known convergent flap and divergent flap, a downstream external fairing flap and an associated upstream external fairing flap. For more details of the two-dimensional exhaust nozzle reference should be made to U.S. Pat. No. 4,690,329 granted on Sep. 1, 1987 to W. M. Madden and assigned to United Technologies Corporation, the assignee common to the assignee of this patent application and incorporated herein by reference.

As noted in FIG. 2, the portion of the sidewall 16 is cut away to illustrate the pumping housing 37 that is attached to the side wall of the aircraft where one end of each of the plurality of crossover tubes generally illustrated by reference numeral 30 is attached. In this instance four crossover tubes 30 are mounted in the sidewall 16 and another four (not shown) are mounted in the sidewall 14.

Reference is now made to FIGS. 3–6 that illustrate the details of crossover tube 30. Spherical ball 32 mounted on one end of rigid tube 36 is adapted to be removably mounted in the socket joint 39 (best shown in FIG. 6) formed in the receiver of casing 34 attached to pumping housing 37. In the assembled position spherical ball 32 is retained in position in the socket 39 by bolting cover plate 60 for 360 degree angular freedom of movement.

Rigid tube 36 fixed at one end to the inside diameter of spherical ball 32 say, by riveting, welding or brazing and extends axially rearwardly toward the receiver 35 attached to the sidewall of the aircraft. A second tube 38 is mounted in telescopic relationship with rigid tube 36 and is limited in rearward travel by the fixed stop 40 extending radially outwardly from the exterior wall of rigid tube 36 and fixed stop 42 extending radially inwardly from the inner diameter of tube 38. Fixed stops 40 and 42 assure that the tubes once assembled do not become dislodged.

Coil spring 46 circumscribing the rigid tube 36 is retained on one end by the annular retainer 48 that includes a reduced diameter portion 50 slipping over the outside with a close fit or suitably attached to the outside diameter of rigid tube 36, say, by welding or brazing and the increased diameter portion 52. The end of coil spring 46 bears against the shoulder 54 formed between the reduced diameter portion 50 and the increased diameter portion 52. The opposite end of coil spring 46 is retained by the clip 56 that is comprised of the circumferentially space axial fingers 57 bent radially inwardly at the forward end to form a lips 58 that engage the cover plate member 60 bolted to casing 34 with socket 39 retaining spherical ball 32. The opposing end of clip 56 is annular in shape and circumscribes rigid tube 36 and is bent in the inner diameter to a U-shaped configuration that defines a retainer 41 for supporting the opposing end of coil spring 46. When assembled, spring 46 which is disposed between retainer 48 and clip 56 is mounted in compression.

The tube 38 is rigidly supported to the spherical ball 65 which is riveted, welded or brazed to the outer diameter thereof and extends axially in the fore direction to engage the tube 36 for telescopic movement. Coil spring 62 circumscribes the tube 38 and a portion of tube 36 and on one end bears against the exterior of the U-shaped bent portion of clip 56 and on the opposing end bears against the end surface 64 of spherical ball 65 and in the assembled position spring 62 is in compression.

It is apparent from the foregoing that the rigid tube 36 when affixed to the socket 39 in receiver of casing 34 allows the tube 38 to move freely in the axial direction and only limited to the displacement dictated by stops 40 and 42 and maximum compression. Tube 38 is held to the forward tube 36 during disassembly. Tube 36 is held in an erect position by the coil spring 46 and clip 52 by virtue of coil spring 46 expanding and forcing the clip 52 against the cover plate 60. The size and spring rate of coil spring 46 is selected to create a large enough moment to overcome the weight of the crossover tube assembly. Obviously, this assures that all of the crossover tubes stand erect during disassembly and are held in axial alignment for ease of assembly into the receiver, as will be described in more detail with regards to the embodiment depicted in FIGS. 6 and 7.

Figure 6:
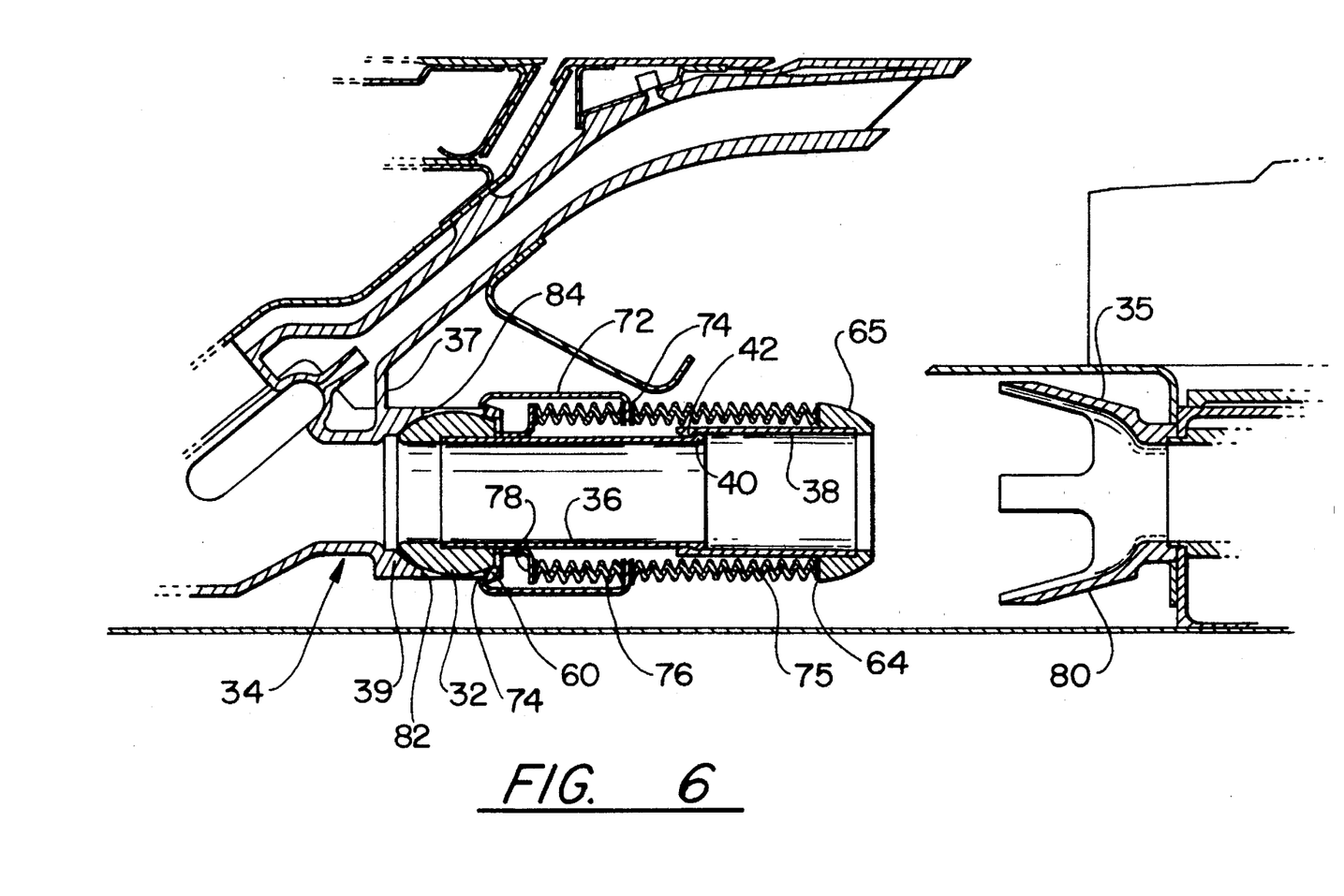
FIG. 6 is a sectional view of the pumping housing taken along a vertical axis including a sectional view of the crossover tube exemplifying another embodiment of this invention and illustrating the position before attachment.
Figure 7:
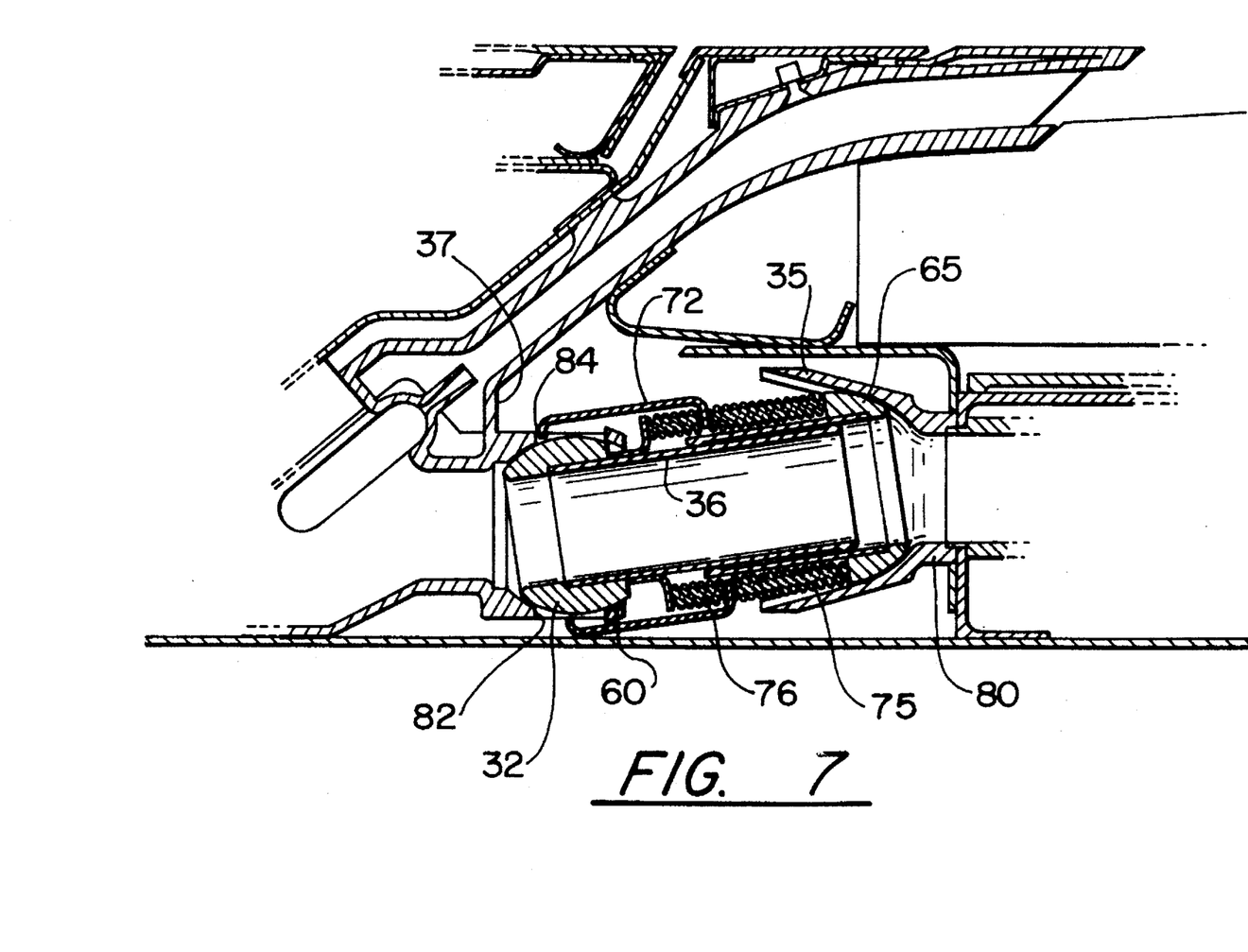
FIG. 7 is a view of the embodiment depicted in FIG. 6 illustrating the attachment of the crossover tube when deflected in a maximum position in one plane.

Referring next to FIGS. 6 and 7 which show substantially the same configuration as that depicted in FIGS. 2–5 but utilizing a pair of bellows in order to prevent leakage from the crossover tubes and also to illustrate the cross over tubes in the various positions when disassembled and assembled with deflections.

As noted in FIG. 6 the socket 39 formed in the pumping housing 37 (like parts depicted in the various FIGS. are identified with like reference numerals) receives spherical ball 32 which is retained by cover plate 60. The tube 36 is held erect by the clip 72 having the bent end 74 bearing against the end face of cover plate 60 and bent at the opposing end 74, bellows 76 supported by retainer 78 affixed to the side wall of tube 36 and bellows 75 supported between the end of bent end 74 and the end face 64 of spherical ball 65. As is apparent from FIG. 6, when the crossover tube 30 is assembled the receiver 80 slides forwardly on rails to engage spherical ball 65 and the orientation of the crossover tube is such that the operator doesn't have to see the blind assembly to have the mating parts engage. All the crossover tubes will engage at the same time.

Top and bottom windows 82 and 84 formed in socket 39 provide sufficient clearance lips 74 (similar to 58 in FIG. 5) to allow for tolerances in the parts and sufficient relative movement of the engine to the airframe. Bellows 76 and 75 in addition to supplying the spring loads to the crossover tube also assure that no leakage will escape from the crossover tubes. FIG. 7 illustrates the assembly of the crossover tube and is in the maximum displacement in this particular plane.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. A deployable crossover tube for conducting fluid from one location to another location, said deployable crossover tube having a tubular telescopic member having a fore end and an aft end defining a straight through passageway, a first fitting means affixed to the fore end of said tubular telescopic member and a second fitting means affixed to the aft end of said tubular telescopic member, a first receiving means affixed to said first fitting means and a second receiving means adapted to receive said second fitting means, said first fitting means with respect to said first receiving means and said second fitting means with respect to said second receiving means permitting swiveling movement of said tubular telescopic member, flexible and resilient means surrounding said tubular telescopic member affixed to said first receiving means for supporting said tubular telescopic member in a predetermined position for being aligned with said second receiving means when said second fitting means is deployed to fit into said second receiving means.

2. A deployable crossover tube for conducting fluid from one location to another location as claimed in claim 1 including a coverplate mounted in said first receiving means and supporting said first fitting means in swiveling position, said flexible resilient means including a pair of axially disposed end abutting members, a clip supported to said coverplate and extending axially and including a depending leg disposed between said pair of axially disposed members at the junction where the ends of said end abutting members abut.

3. A deployable crossover tube for conducting fluid from one location to another location as claimed in claim 2 wherein said pair of axially disposed members includes a first coil spring and a second coil spring, said telescopic tube including a forward tube and a rearward tube, a spring retainer attached to said forward tube for supporting one end of said first coil spring and the end of said second coil spring supported by said second fitting to urge said tubular telescopic means in the extended position before being deployed.

4. A deployable crossover tube for conducting fluid from one location to another location as claimed in claim 3 wherein said first fitting means is a spherical ball and said second fitting means is another spherical ball.

5. A deployable crossover tube for conducting fluid from one location to another location as claimed in claim 4 wherein said first receiving means includes a first receiver for supporting said first spherical ball and said second receiving means includes a second receiver for guiding and supporting said second spherical ball whereby said tubular telescopic member is deployed in fluid conducting relationship with said first receiver and said second receiver.

6. A deployable crossover tube for conducting fluid from one location to another location as claimed in claim 5 including stop means mounted on the end of said first tube and said second tube for preventing said first tube and second tube from separating.

7. A deployable crossover tube for conducting fluid from one location to another location as claimed in claim 6 wherein said first receiver includes a socket joint for supporting said first spherical ball.

8. A deployable crossover tube for conducting fluid from one location to another location as claimed in claim 3 wherein said pair of axially disposed flexible resilient means includes a first bellows and a second bellows.

9. A deployable crossover tube for conducting fluid from one location to another location as claimed in claim 8 wherein said tubular telescopic tube includes a forward tube and a rearward tube, a first spherical ball attached to the forward end of said forward tube and a second spherical ball attached to the aft end of said second tube, said first bellows and said second bellows being in end to end abutting relationship with each other, a retainer attached to said forward tube for supporting one end of said first bellows and an end face of said second spherical ball bearing against the aft end of said second bellows to urge said tubular telescopic means in the extended position.

10. In combination, an exhaust nozzle for a gas turbine engine mounted in a nacelle of an aircraft, said nacelle including at least one side wall that is moveable relative to said exhaust nozzle, a deployable crossover tube means for placing said nacelle and said exhaust nozzle in fluid flow relationship when said crossover tube is deployed when said side wall is positioned relative to said exhaust nozzle, said deployable crossover tube having a tubular telescopic member defining a straight through passageway, said telescopic member including a fore end and an aft end a first fitting means including a first spherical ball affixed to the fore end of said tubular telescopic member and a second fitting means including a second spherical ball affixed to the aft end of said tubular telescopic member, a first receiving means affixed to said first fitting means and a second receiving means adapted to receive said second fitting means, said spherical ball of said first fitting means and said spherical ball of said second fitting means permitting swiveling movement of said tubular telescopic member, flexible and resilient means surrounding said tubular telescopic member affixed to said receiving means for supporting said tubular telescopic member in a predetermined position for being aligned with said second receiving means when said second fitting means is deployed to fit into said second receiving means.

11. In combination as claimed in claim 10 including a coverplate mounted in said first receiving means and supporting said first fitting means in swiveling relationship, said flexible resilient means including a pair of axially disposed end abutting members, a clip supported to said coverplate and extending axially and including a depending leg disposed between said pair of axially disposed members at the junction where the ends of said abutting members abut.

12. In combination as claimed in claim 11 wherein said pair of axially disposed members includes a first coil spring and a second coil spring, said telescopic tube including a forward tube and a rearward tube, a spring retainer attached to said forward tube for supporting one end of said first coil spring and the end of said second coil spring supported by said second fitting to urge said tubular telescopic means in the extended position before being deployed.

13. In combination as claimed in claim 12 wherein said receiving means includes a first receiver for supporting said first spherical ball and a second receiver for guiding and supporting said second spherical ball whereby said tubular telescopic member is deployed in fluid conducting relationship with said first receiver and said second receiver.

14. In combination as claimed in claim 11 wherein said pair of axially disposed flexible resilient means includes a first bellows having an aft end and a second bellows.

15. In combination as claimed in claim 14 wherein said tubular telescopic tube includes a forward tube and a rearward tube, said first bellows and said second bellows being in end to end abutting relationship with each other, a retainer attached to said forward tube for supporting one end of said first bellows and an end face of said second spherical ball bearing against the aft end of said second bellows to urge said tubular telescopic means in the extended position whereby said crossover tube interconnects said exhaust nozzle and sidewall when deployed.

* * * * *